Patented Feb. 21, 1933

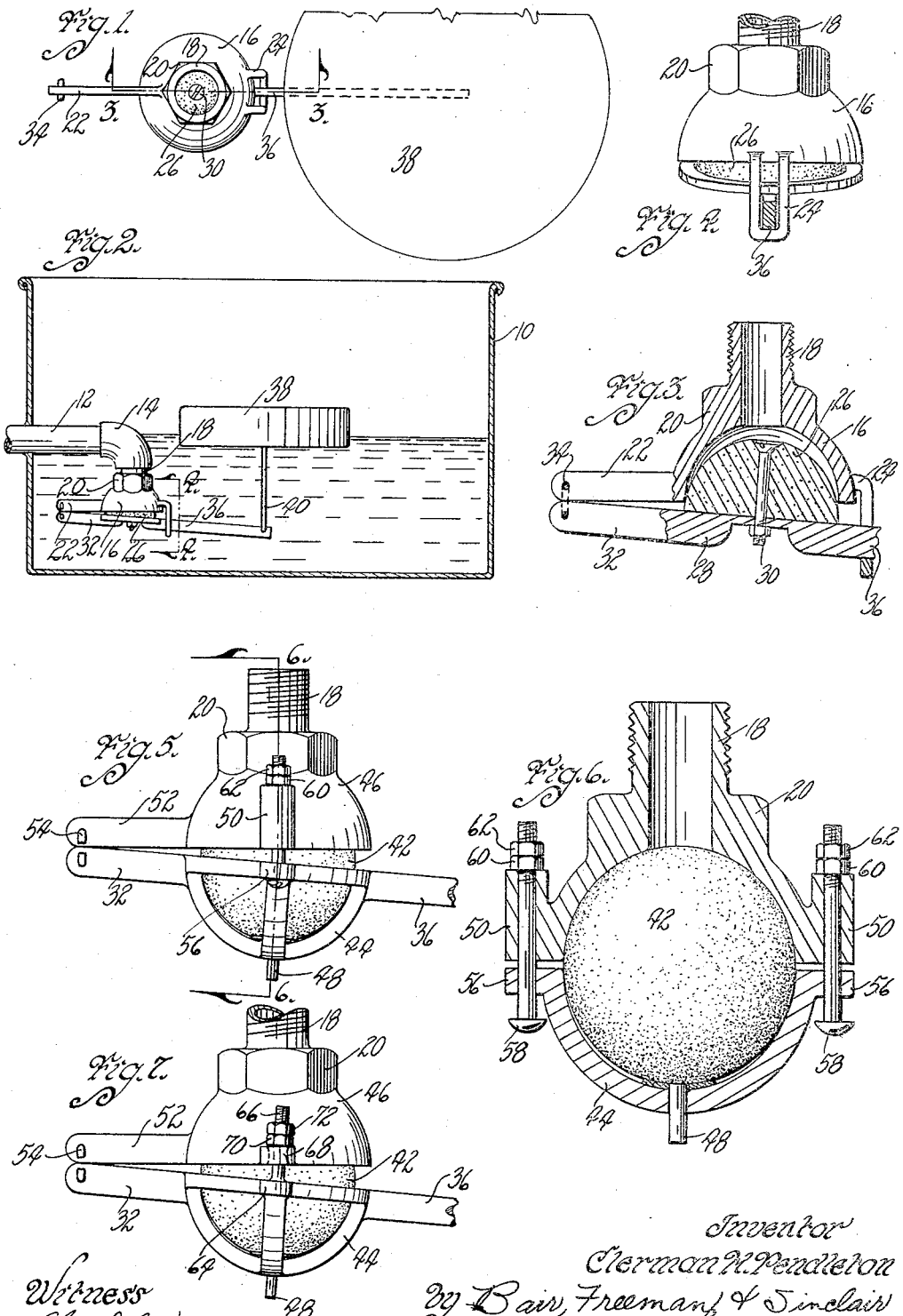

1,898,389

UNITED STATES PATENT OFFICE

CLERMAN H. PENDLETON, OF ESSEX, IOWA

FLOAT VALVE

Application filed August 25, 1930. Serial No. 477,617.

The object of this invention is to provide an improved construction for a float controlled valve for water tanks and the like.

A further object of the invention is to provide an improved float valve which is compact and is adapted for use in tanks of small area.

Another object is to provide an improved float valve structure including an inverted cup-shaped fitting in which the valve seat is formed and a spherical valve member adapted to be seated in this fitting by the action of a float in such manner as to thoroughly and effectively close the valve opening and automatically shut off the flow of liquid.

Another and further object of the invention is to provide a float valve structure which is simple and economical to produce and which is sure and efficient in its operation and not apt to get out of order.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a plan view of a float assembly embodying my invention.

Figure 2 is a side elevation of the same, partly in section.

Figure 3 is a vertical section through the valve structure on the line 3—3 of Figure 1.

Figure 4 is a transverse sectional view on the line 4—4 of Figure 2.

Figure 5 is a side elevation illustrating a valve structure of modified form.

Figure 6 is an enlarged vertical section of the same on the line 6—6 of Figure 5.

Figure 7 is a side elevation of a still further modified form.

In the accompanying drawing I have employed the numeral 10 to designate a tank adapted to receive and contain water or other liquid and in which it is desired to maintain the liquid at a fairly constant level. The water is introduced to the tank 10 by means of a pipe 12 which terminates in a downwardly directed elbow 14.

The valve device includes a fitting 16 of inverted cup-shape, having an upwardly directed nipple 18 which is threaded and adapted to be received in the downwardly directed portion of the elbow 14. If desired, the fitting may be formed with an angular wrench-receiving portion 20 at the base of the nipple 18 to facilitate the operation of establishing the threaded connection between the fitting and the elbow or other member on which it is desired to mount it.

The fitting 16 is formed with a smooth internal surface of substantially hemispherical form which constitutes a valve seat at the apex of which the passage through the nipple 18 communicates.

The valve fitting 16 is formed at one side with a laterally extending rigid arm 22 and at the diametrically opposite side with a downwardly extending stirrup 24.

A valve member 26 is provided and is adapted to cooperate with the valve seat formed in the fitting 16. The valve member 26 preferably is formed of rubber and as shown in Figures 3 and 4, it is hemispherical in form and adapted to fit snugly within and have a large surface contact with the inner surface which constitutes the valve seat of the member 16.

The valve member 26 is mounted on a valve support including a disk 28, and is secured thereto as by means of a bolt 30.

The disk 28 is formed at one side with a laterally projecting arm 32 and the outer end of said arm is pivotally connected to the outer end of the arm 22 as by means of a link 34.

At a point diametrically opposite to the arm 32 the disk 28 is formed with an outwardly projecting float arm 36 which extends loosely through the stirrup 24 and is adapted for a limited vertical movement therein.

A float 38 of suitable character is provided and this float is equipped with a stem 40 projecting downwardly and having a pivotal connection with the outer end of the float arm 36.

In use, the valve device is opened by gravitation and is closed by upward movement of the float 38 as the level of water in the tank 10 rises.

When water in the tank falls below the normal level the float arm 36 engages the cross bar of the stirrup 24 and the valve member 26 is carried away from the spherical member 16, thus permitting water to enter the tank through the pipe 12, elbow 14 and valve fitting.

As the water rises in the tank, the float 38 of course, rises with it and in so doing it exerts an upward pull on the outer end of the float arm 36, thus causing the valve member 26 to approach and finally engage the valve seat in the member 16.

It will be noted that the corresponding spherical faces of the valve member 26 and seat in the member 16 permit a large surface contact so that the inflow of water is very effectively cut off when the valve member is seated.

In the form shown in Figures 5 and 6 I have employed a truly spherical valve member which is designated by the numeral 42. This member may be composed of a ball of rubber or the like.

In this construction the support for the valve member 42 consists of a substantially semi-spherical or cup-shaped cradle 44 which may be of skeleton form as shown particularly in Figure 5.

The spherical valve member 42 may be seated loosely in the cradle 44 with substantially one-half of its mass projecting upwardly therefrom and adapted to enter the semi-spherical valve fitting which I have here designated by the numeral 46.

If desired, the valve member 42 may be equipped with a downwardly projecting pin 48 which extends loosely through an opening in the bottom of the cradle 44.

In the modified form of my device the stirrup 24 is omitted and other means is provided to permit limited vertical movement of the valve member and its support.

For this purpose the valve fitting 46 is provided with vertically apertured ears 50 arranged on its lateral sides and equally spaced from the rigid arm 52 to which the valve support is pivoted by the link 54.

The cradle 44 is also provided with laterally projecting ears 56 which are arranged in alinement with the ears 50.

Bolts 58 are mounted freely through the respective ears 56 and 50 and are threaded at their upper ends to receive nuts 60 and lock nuts 62. The nuts 60 are so arranged as to permit a limited vertical movement of the cradle and valve relative to the valve fitting.

In the further modified form disclosed in Figure 7, the ears 64 formed on the valve cradle 44 are not apertured but serve as rigid supports for upwardly projecting threaded studs 66 which pass freely through apertured ears 68 on the fitting 46. The threaded studs 66 receive at their upper ends nuts 70 and lock nuts 72 which permit a limited vertical movement of the cradle and valve.

My improved float valve assembly has been found to be very efficient in use because the spherical surface of the valve engages a large surface of the valve seat and effectively seals it against the inflow of water. Furthermore the parts are simple in their arrangement and there are very few working parts which would have a tendency to get out of order.

The valve member, whether of spherical or hemispherical form, is relatively inexpensive and can readily be removed and replaced should occasion require it.

My improved construction and arrangement of parts has one particular advantage in that the parts are compact and the float 30 may be arranged close to the valve fitting so that little space is occupied. This permits the device to be used in a tank of small capacity or having a limited horizontal area.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention :—

1. A float valve structure comprising a fitting formed with a valve seat of substantially hemi-spherical contour with an inlet opening centrally thereof, a valve support beneath and loosely pivoted at one side to said fitting, said support being formed with a cup-shaped cradle comprising a hub and spokes, a spherical valve member mounted in said cradle, said spokes being curved to substantially fit the contour of said valve member said valve member being of uniform diameter with said valve seat and adapted to fit therein for closing said inlet opening, and a float arm extending laterally from said valve support on the side opposite to its pivotal connection, said float arm being arranged for connection to a float.

2. A float valve structure comprising a fitting formed with a valve seat of substantially hemi-spherical contour with an inlet opening centrally thereof, a valve support beneath and loosely pivoted at one side to said fitting, said support being formed with a cup-shaped cradle comprising a perforated hub and spokes, a spherical valve member mounted in said cradle and having a pin-like extension to project through the perforation in said hub, said valve member being of uniform diameter with said valve seat and adapted to fit therein for closing said inlet opening, and a float arm extending laterally from said valve support on the side opposite to its pivotal connection, said float arm being arranged for connection to a float.

CLERMAN H. PENDLETON.